United States Patent Office 3,076,040
Patented Jan. 29, 1963

3,076,040
STABILIZED SOLVENT COMPOSITION
Maxwell J. Skeeters, Painesville, Ohio, assignor to Diamond Alkali Company, Cleveland, Ohio, a corporation of Delaware
No Drawing. Filed Apr. 4, 1960, Ser. No. 19,482
10 Claims. (Cl. 260—652.5)

This invention relates to the stabilization of particularly trichloroethylene, against decomposition under the influence of heat, moisture, light, air and metal surfaces. The invention is concerned especially with stabilizing trichloroethylene against decomposition caused by exposure to light and with compositions including it and a special stabilizer, the particular function of which is to inhibit light-catalyzed decomposition. Additionally, the invention relates to a composition comprising trichloroethylene, a general purpose stabilizer functioning to inhibit decomposition especially against the effects of heat, moisture, air and metal surfaces, and a special light stabilizer.

This application is a continuation-in-part of my copending application Serial No. 410,735, filed February 16, 1954, now U.S. Patent No. 2,947,792.

It has been known heretofore that chlorohydrocarbons, for example, tetrachloroethylene and trichloroethylene, of a high degree of purity and containing only minute amounts of saturated, or other unsaturated, lower aliphatic chlorohydrocarbons is very inert to the action of air, light, heat, moisture, and metal surfaces with which they come into contact during storage and commercial use. However, the obtaining of such high purity chloroethylenes in commercial production is not generally feasible and it has been found that the impure material normally encountered in commerce decomposes when in contact with the substances noted above. Hence, means other than purification for preventing or inhibiting the decomposition of these chloroethylenes and the lower chlorinated aliphatic hydrocarbons generally associated therewith must be had.

It is generally believed that trichloroethylene exposed to air, light, heat, moisture, etc., decomposes, especially in the presence of moisture, principally by way of oxidative attack at the double bond involving a series of steps in which the ultimate products include phosgene, dichloroacetic acid, and hydrogen chloride. It is also believed that the oxidative attack is catalyzed by light and by the products of oxidation, as a result of which, oxidative decomposition once initiated is self-catalyzing and self-sustaining. Other chlorohydrocarbons generally associated with crude commercial trichloroethylene also are subject to oxidative attack and decompose to some of the same products as those formed by the oxidation of trichloroethylene, and at a somewhat accelerated rate, as compared to the oxidation of trichloroethylene. These products are then available to catalyze the decomposition of the trichloroethylene. For example, trichloroethylene obtained commercially from the crude products of chlorination and dehydrochlorination of lower aliphatic hydrocarbons may contain small but appreciable amounts of saturated and unsaturated chlorinated hydrocarbons, such as chloroacetylenes, dichloroethylene, tetrachloroethylene, trichloroethane, unsymmetrical tetrachloroethane, pentachloroethane, and the like. These lower chlorohydrocarbons in themselves are relatively innocuous in solvent extraction processes in which the trichloroethylene is used, but the oxidation decomposition products thereof corrode metal surfaces with which a body of trichloroethylene containing them comes into contact. These less stable chlorohydrocarbons are believed to be the principal initial source of chloro-oxygen-containing impurities, such as phosgene, chloroacetic acid, dichloroacetic acid, and the like, in the trichloroethylene, which impurities catalyze decomposition of the trichloroethylene.

The problem, therefore, is principally one of inhibiting initiation of the oxidation of chlorohydrocarbons commonly associated with commercial trichloroethylene and similar compounds, as well as inhibiting the oxidation of trichloroethylene itself.

Accordingly, the primary object of the present invention is to provide means for inhibiting oxidation of trichloroethylene, and the lower aliphatic chlorocarbons, and chlorohydrocarbons generally associated therewith during exposure especially to light, and also to air, heat, moisture, and metal surfaces.

This and other objects will be apparent to those skilled in the art from the discussion hereinafter.

Trichloroethylene is a solvent which is widely employed particularly in the dry cleaning of fabrics and in the degreasing of metals, such as steel, aluminum and brass. These applications of the solvent expose it to the several decomposing effects, as a result of which, impurities as noted above form therein and create rather serious problems. In particular, fabrics cleaned with such contaminated solvent appear dull and lifeless, especially fabrics in pastel colors, and the odor of the residual solvent in the fabric and the cleaning plant becomes increasingly unpleasant. As applied in metal degreasing, such contamined solvent corrodes the metal and discolors or stains it even where contamination is slight. Even some stabilized products produce adverse effects such as, for example, reduced cleaning efficiency, staining of metals such as brass and aluminum. Also, some stabilized compositions are not fully compatible with soaps and detergents.

It is known that trichloroethylene may be stabilized by the addition of one or more of a wide variety of organic compounds, which compounds may be referred to as general-purpose decomposition inhibitors or stabilizers. In order to indicate the variety of materials which have been proposed as general-purpose stabilizers, it is desired to set forth compounds which are exemplary of such general-purpose stabilizers.

Accordingly, suitable materials are as follows: hydrocarbon derivatives are effective, especially those containing nitrogen, such as amines, for example, ethyl and diethylamine, triethylamine, tributylamine, and hexamethylenetetraamine. Pyrrole and derivatives, such as N-methyl or N-ethyl pyrrole, 2-methyl pyrrole, 2,4-dimethyl pyrrole and 2-chloropyrrole may be used. Alcohols, and derivatives thereof, such as amino and alkoxy alcohols have been employed; hydroxy-aromatic compounds, for example, thymol, phenol, catechol, hydroquinone and its monoalkyl and monoaralkyl ethers, hexylresorcinol and p-tertiarybutylphenol have been proposed. Some of these stabilizing materials are more effective than others and they vary in cost. Generally, the selection is based upon satisfactory performance at minimum cost.

Although some, if not all of the mentioned general-purpose stabilizers function to some degree to inhibit light-catalyzed decomposition, it is customary to add a second stabilizer for the particular purpose of securing light stability for the composition. For example, it is known to add materials such as benzaldehyde and thymol. Benzaldehyde is especially effective but it has now been found to be undesirable for use in metal cleaning because it stains the metal in the contact cleaning process; for example, brass is discolored to a pinkish cast even by the small quantity of stabilizer that the composition requires. In preparing the stabilized composition, it is desirable to keep the necessary quantity of stabilizers as low as possible, consistent with the desired result. Accordingly, since the light stabilizer has been found highly desirable, attempts have been made to find a light stabilizer which functions as a general stabilizer whereby the quantity of the general stabilizer can be reduced or perhaps eliminated. Similarly, it might be desired to increase general stabilizing effects without reducing the quantity of general stabilizer. It is not believed that any of the known stabilizers satisfy this need. As will appear more fully herein, the stabilizer pair of the present invention avoids the difficulties mentioned above.

It is now known that where the crude trichloroethylene, particularly that obtained from commercial processes involving the chlorination and/or dehydrochlorination of lower aliphatic hydrocarbons or hydrocarbon chlorides, or the chlorination and simultaneous dehydrochlorination of aliphatic hydrocarbon chlorides, such as ethylene dichloride, or of unsaturated hydrocarbons, such as acetylene, ethylene, ethane, and the like, contains appreciable amounts of lower chlorinated aliphatic hydrocarbons other than trichloroethylene as impurities, such crude product may initially be treated with an aqueous solution of an inorganic base and a high boiling point organic base in order to destroy the major portion of volatile acids and acid-forming impurities.

According to this invention, it has been found that trichloroethylene so treated may be stabilized substantially permanently, even under extremely adverse conditions imposed by all of the several decomposing forces, and then be employed in metal degreasing, dry cleaning and other operations without encountering the problem mentioned above, notably, staining of the metals, and the objectionable odor. Additionally, use of the stabilizing compositions according to this invention result in greatly improved color clarity of treated fabrics, especially those in pastel colors. The composition of the present invention also enhances general stability of the solvent to a marked degree over previously known stabilizing compositions. Furthermore, the improved results may be enjoyed without significant cost increase.

According to the present invention, these results are accomplished by combining with such purified trichloroethylene, stabilizing amounts of an acetylenic alcohol wherein the —OH group is attached to a carbon atom in the alpha position to the triple bond, especially 2-methyl-3-butyne-2-ol and 3-methyl-1-pentyne-3-ol hereinafter referred to respectively for convenience as methyl butynol and methyl pentynol and light stabilizing amounts of a 2-alkyloxy, 4-alkene-1, phenol of the general formula

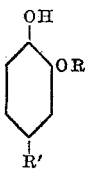

wherein R is a lower alkyl hydrocarbon radical such as methyl, ethyl, propyl, and butyl because of their increased compatibility with the solvent and the environment of its usage. R' is a 1-alkenyl hydrocarbon chain, for example, propylene, butylene, pentene, decene, their isomers and the like.

In particular, isoeugenol is employed because of its high stabilizing character and ready availability. Isoeugenol is more particularly described by the formula, 2-methoxy-4-propenylphenol.

Compounds within the above generic formula, and especially isoeugenol, are employed to light-stabilize a trichloroethylene product containing minor amounts of impurities such as the lower aliphatic chlorohydrocarbons, particularly in the liquid phase, in combination with an acetylenic alcohol as herein defined. Stabilization effects are found generally to be more pronounced where the trichloroethylene has been pretreated to remove or destroy the greater part of the impurities, such as hydrogen chloride, phosgene, and the chloro-acids, prior to combining it with the stabilizer, in order that the stabilizer may exert its maximum effect in preventing decomposition of the trichloroethylene to these products.

The initial treatment of the crude trichloroethylene may include adding an organic base of the amine type and having a boiling point substantially higher than the trichloroethylene, for example, aniline in an amount from approximately 0.2–2.0% by weight to the crude product, and fractionally distilling the crude mass so as to recover substantially all of the trichloroethylene as an intermediate fraction in the distillation; additional treatments may include washing the crude trichloroethylene with a solution of an inorganic base, such as an alkali metal or alkaline earth metal base, for example, sodium hydroxide, sodium carbonate, calcium hydroxide, magnesium bicarbonate, and the like, prior to distillation, and then drying the washed product and distilling the dried product combined with aniline, as noted above, to recover a more highly refined trichloroethylene fraction. The purpose in using an amine, such as aniline, is to allow for the reaction of such amine with acid chloride products contained in the crude product, whereby an anilide or analogous compound may form during distillation and the undesired impurity is retained in the distillation residue. The purpose of washing the crude trichloroethylene with an alkali metal or alkaline earth metal base is to remove the more volatile of the acid chloride impurities, such as hydrogen chloride, phosgene, and the like, which may not have reacted with the amine.

The crude product may also be combined with an amine having a boiling point substantially higher than trichloroethylene, generally in an amount from 0.2–2.0% by weight, and the mixture thus obtained distilled as described above, and the trichloroethylene fraction washed initially with a solution of an inorganic base, such as those noted above and dried.

Where impurities such as hydrogen chloride, phosgene, chloroacids and the like, are known to be extremely low in the crude product, this material may be combined with an amine such as aniline, as noted hereinabove, and subjected to fractional distillation to recover the substantially pure trichloroethylene without the necessity of resorting to the treatment with a solution of an inorganic base. Moreover, the dilute alkaline wash may be omitted even where the chloro-oxygen-containing compounds are present in appreciable quantities in the crude product, but it has been found that the amount of organic amine consumed and the volume of distillation residue accumulated are excessive.

The beneficial effects of the stabilizer pair of the present invention may also be realized where trichloroethylene has been purified in a commercial operation and stabilized either with a high boiling point stabilizer, i.e., a stabilizer such as one of the amine or of the ether type having a higher boiling point than that of trichloroethylene, or with stabilizers which are more volatile than trichloroethylene, by removing such stabilizer as by chemical reaction, azeotropic distillation, or the like; the thus-treated mass is then fractionally distilled to recover the trichloroethylene fraction, which may be combined with an acetylenic alcohol as herein defined and a light-stabilizer of the class as noted hereinabove, in amounts sufficient to effect stabilization, whereby the trichloroethylene is rendered especially suitable, due to its stability, for degreasing or dry cleaning operations.

The trichloroethylene may be combined with a stabilizing amount of the acetylenic alcohol in accordance herewith and a light-stabilizing amount of a light-stabilizer of the general formula set out above, from about 0.001–1% of each based on the weight of trichloroethylene, preferably, however, from about 0.005–0.1%. Amounts as high as 1% of each stabilizer or even higher are contemplated where the quantity of impurities is known to be high, as where an unpurified trichloroethylene product is to be stabilized or where the stabilized product will be employed in unusually adverse circumstances.

Conversely, amounts as low as 0.001% are contemplated for use where the stabilized product will be exposed to light of low intensity or for a short time only. Generally, however, trichloroethylene pretreated for impurity reduction as explained hereinabove may be stabilized for its more important uses by less than 0.01% of the light-stabilizer and a greater amount of the acetylenic alcohol. The acetylenic alcohol with which the light stabilizer is combined in the solvent is employed, generally in amounts from about 0.1% to about 1% by weight of the solvent; usually, however, about 0.25% by weight is adequate.

In the examples to be set forth hereinafter, reference will be made to stability tests to which the exemplary compositions are subjected. In order to avoid needless repetition in the several examples, these tests are now explained in detail and are referenced to this explanation in a general way in the examples:

One hundred mls. of the trichloroethylene to be tested for stability are placed in a 300-ml. flask equipped with a ground glass joint. A copper strip 2.0 x 7.5 x 0.005 cm., which has been washed with concentrated hydrochloric acid, rinsed with water, dried and weighed, is placed in the flask. Next, 0.2 ml. of water is added. The flask is attached to a small Soxhlet extractor equipped with a bottom ground glass joint and a top ground glass joint. A bulb type condenser with a bottom ground glass joint is attached to the Soxhlet extractor. An acid-washed, weighed copper strip (2.0 x 7.5 x 0.005 cm.) is placed in the Soxhlet extractor, and another acid-washed and weighed copper strip of the same size is placed in the bottom part of the condenser, so that the condensing trichloroethylene condenses on the strip. A water scrubber (containing 150–200 mls. $H_2O$) attached to the top of the condenser absorbs any HCl that is evolved during the stability test. To prevent the sucking back of water into the condenser and Soxhlet extractor, two filter flasks, so arranged that water is pushed from one flask to the other with changes in pressure, are employed. The 300 ml. flask containing the copper strip and trichloroethylene to be tested is attached to the Soxhlet extractor and heated on a heater controlled to adjust the boiling rate so that the Soxhlet extractor empties every 8–10 minutes. A 100-watt bulb is placed one inch from the vapor line of the Soxhlet extractor to furnish light for the photochemical oxidation. The stability test is run for 72 hours.

The aggregate loss in weight of the copper strips is a measure of the stability of the trichloroethylene tested. This test may suitably be termed a general stability test for examining the effectiveness of the stabilizer pair compared with known stabilizers of known effectiveness.

In general, material which shows a 45 mg. aggregate loss in weight in the 3 copper strips over the period of the test is acceptable for dry cleaning purposes (National Institute of Cleaning and Dyeing, Perchloroethylene (Drycleaning), Tentative Standard 3–50). 18 mg. loss is closer to industry standards, however, but naturally the more stable the material, the better.

In order that those skilled in the arts may better understand the present invention and in that manner the same may be carried into effect, the following specific examples are offered:

*Example I*

Trichloroethylene is obtained in admixture with other chlorocarbons such as perchloroethylene, by thermally chlorinating and dehydrochlorinating a mixture of ethylene and ethylene dichloride with gaseous chlorine in the approximate ratio of chlorine to hydrocarbon and chlorohydrocarbon to form trichloroethylene, followed by washing with dilute aqueous caustic soda, decanting the aqueous phase, and distilling the mixture after adding 1% of aniline by weight of the distilland, and separately recovering the trichloroethylene fraction. Duplicate samples of each of two trichloroethylene fractions, taken from two different distillands are combined (A) with 0.25% of methyl pentynol and 0.005% of isoeugenol, by weight of each trichloroethylene sample, and (B) with 0.25% of the monomethyl ether of hydroquinone, a solvent stabilizer recognized in the metal degreasing art as providing a high standard for comparison performance of other stabilizers.

Each of these stabilized samples of trichloroethylene is subjected to the above-described stability test, the numerical values representing the milligrams loss of each of the copper strips placed in the flask (numbered 1), Soxhlet extractor (numbered 2), and condenser (numbered 3) of the stability testing apparatus, with the following results:

|   | Stabilizer | | Loss | Stabilizer | | Loss |
|---|---|---|---|---|---|---|
| (A) | Hydroquinone monomethyl ether | 1<br>2<br>3 | 2.4<br>4.7<br>33.7 | Isoeugenol and methyl pentynol | 1<br>2<br>3 | 2.6<br>3.1<br>18.1 |
|   | Total |   | 40.8 | Total |   | 23.8 |
| (B) | Hydroquinone monomethyl ether | 1<br>2<br>3 | 2.7<br>6.9<br>4.3 | Isoeugenol and methyl pentynol | 1<br>2<br>3 | 2.6<br>3.7<br>18.0 |
|   | Total |   | 13.9 | Total |   | 24.3 |

*Example II*

Using duplicate samples from each of three additional trichloroethylene fractions, obtained as described above, from three different distillands, the following results are obtained:

|   | Stabilizer | | Loss | Stabilizer | | Loss |
|---|---|---|---|---|---|---|
| (A) | Hydroquinone monomethyl ether | 1<br>2<br>3 | 1.6<br>2.7<br>12.2 | Methyl pentynol and isoeugenol | 1<br>2<br>3 | 1.8<br>2.6<br>8.0 |
|   | Total |   | 16.5 | Total |   | 12.4 |
| (B) | Hydroquinone monomethyl ether | 1<br>2<br>3 | 2.7<br>3.2<br>12.0 | Methyl pentynol and isoeugenol | 1<br>2<br>3 | 2.4<br>2.8<br>8.1 |
|   | Total |   | 17.9 | Total |   | 13.3 |
| (C) | Hydroquinone monomethyl ether | 1<br>2<br>3 | 2.2<br>2.9<br>23.4 | Methyl pentynol and isoeugenol | 1<br>2<br>3 | 1.3<br>3.2<br>11.7 |
|   | Total |   | 28.5 | Total |   | 16.2 |

From the above data it will be apparent that the stabilizer pair of the present invention, i.e., an acetylenic alcohol and a 4-hydroxy-3-alkoxy-1-propenyl benzene is superior to the industry-recognized hydroquinone monomethyl ether. Moreover, it is apparent that the stabilizer pair of the present invention is far more effective in imparting stability of the trichloroethylene in the vapor phase, as evidenced by a lesser loss in weight of the copper strips in the condenser and Soxhlet extractor (after the trichloroethylene has been vaporized and exposed to light prior to being condensed again).

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition of matter comprising trichloroethylene and as a stabilizer pair, an acetylenic alcohol wherein the —OH group is attached to a carbon atom alpha to the triple bond, and a light stabilizing quantity of a compound of the general formula

wherein R is a lower alkyl hydrocarbon radical, and R' is a 1-alkenyl hydrocarbon chain, both substituents of said stabilizer pair being present in an amount of at least 0.001% by weight of said trichloroethylene.

2. A composition of matter as claimed in claim 1 wherein R is an alkyl hydrocarbon radical of no more than 4 carbon atoms and R' is a 1-alkenyl radical of not more than 10 carbon atoms.

3. A composition of matter as claimed in claim 1 wherein R is methyl and R' is a 1-propenyl radical.

4. A composition of matter as claimed in claim 1 wherein the said compound is isoeugenol.

5. A composition of matter as claimed in claim 1 wherein the acetylenic alcohol is 2-methyl-3-butyne-2-ol.

6. A composition of matter as claimed in claim 2 wherein the acetylenic alcohol is 3-methyl-1-pentyne-3-ol.

7. A composition of matter comprising trichloroethylene and from about 0.1 to about 1% by weight of an acetylenic carbinol wherein the —OH group is attached to a carbon atom alpha to the triple bond, and as a light stabilizer, from about 0.001% to about 0.1% by weight isoeugenol.

8. A composition as claimed in claim 7 wherein the said acetylenic carbinol is methyl pentynol.

9. A composition as claimed in claim 7 wherein the acetylenic carbinol is methyl butynol.

10. A composition of matter comprising trichloroethylene, about 0.25% by weight methyl pentynol, and about 0.01% by weight isoeugenol.

References Cited in the file of this patent
UNITED STATES PATENTS

| | | |
|---|---|---|
| 2,126,179 | Duggan | Aug. 9, 1932 |
| 2,775,624 | Skeeters et al. | Dec. 25, 1956 |
| 2,947,792 | Skeeters | Aug. 2, 1960 |